United States Patent [19]

Lin

[11] Patent Number: 4,655,470
[45] Date of Patent: Apr. 7, 1987

[54] HAND-PROPELLED WHEELED DEVICE FOR CHILDREN

[76] Inventor: Shih-Lang Lin, No. 13, Alley 10 Lane 27, Sec. 2, Chung Hsing Rd., Five ku Hsiang, Taipei, Hsien, Taiwan

[21] Appl. No.: 850,860

[22] Filed: Apr. 11, 1986

[51] Int. Cl.$^4$ .............................................. B62K 1/14
[52] U.S. Cl. ...................... 280/211; 280/242 R; 280/287
[58] Field of Search ............... 280/242 R, 24, 224, 280/225, 242 WC, 259, 287, 282

[56] References Cited

U.S. PATENT DOCUMENTS

| | | | |
|---|---|---|---|
| 2,986,406 | 5/1961 | Kahl | 280/287 |
| 3,306,627 | 2/1967 | Goto | 280/282 |
| 3,438,649 | 4/1969 | Schermerhorn | 280/282 |
| 3,450,416 | 6/1969 | Mulder | 280/211 |
| 3,820,790 | 6/1974 | Peterson | 280/211 |
| 3,960,392 | 6/1976 | Read | 280/282 |
| 4,066,273 | 1/1978 | Lohr | 280/242 R |
| 4,077,647 | 3/1978 | Nagayama | 280/242 R |
| 4,441,729 | 4/1984 | Underwood | 280/287 |

*Primary Examiner*—John A. Pekar
*Attorney, Agent, or Firm*—Poms, Smith, Lande & Rose

[57] ABSTRACT

A hand-propelled wheeled device for children comprises a substantially circular frame which is assembled from two U-shaped tubular pipes, two side wheels which are rotatably mounted inwardly along two opposite and parallel sides of the frame, each side wheel having a hand grip provided thereon for manually propelling and steering the device, a seat supporting member disposed longitudinally within the frame and parallel to the two side wheels and a footrest, a seat, and an auxiliary wheel mounted to the supporting member.

2 Claims, 3 Drawing Figures

HAND-PROPELLED WHEELED DEVICE FOR CHILDREN

BACKGROUND OF THE INVENTION

This invention pertains to a hand-propelled wheeled device for a person, especially for children.

Wheeled tricycles have been shown to be useful for developing a child's physical strength. However, when such devices are made for children, safety considerations are of strong importance. Conventional wheeled devices intended for children are usually heavy, complicated in their construction, and fail to meet safety requirements for children.

SUMMARY OF THE INVENTION

It is therefore a primary object of the present invention to overcome the foregoing and other disadvantages of conventional wheeled devices intended for children.

A further object of the present invention is to provide a hand-propelled wheeled device which is lightweight and simple to construct.

A further object of the present invention is to provide a hand-propelled wheeled device intended for children which is easily assembled and disassembled and may be produced at a very low cost.

Yet another object of the present invention is to provide such a hand-propelled wheeled device which is useful in developing a child's physical strength.

Yet still a further object of the present invention is to provide such a hand-propelled device which possesses a low center of gravity.

Another object of the present invention is to provide a hand-propelled device that is suitable for children between the ages of four and eight.

These, and other objects and advantages of the present invention, will become more apparent from a consideration of the following detailed description of the preferred embodiments, when read in conjunction with the accompanying drawings.

DETAILED DESCRIPTION OF THE PREFERRED EMBODIMENT

Figure 1:
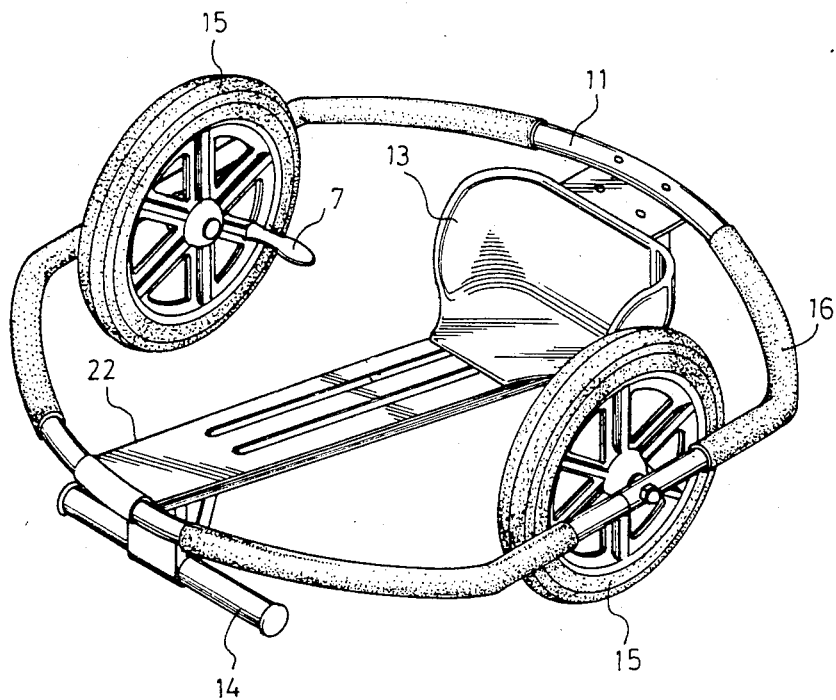
FIG. 1 is a perspective view of a hand-propelled wheeled device in accordance with the subject of the present invention.
Figure 2:
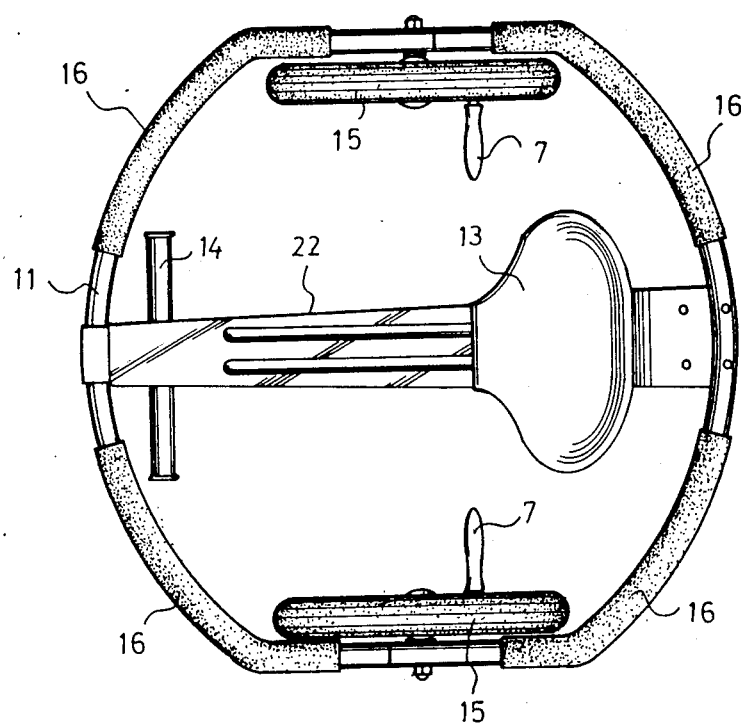
FIG. 2 is a top view of the hand-propelled wheeled device.
Figure 3:
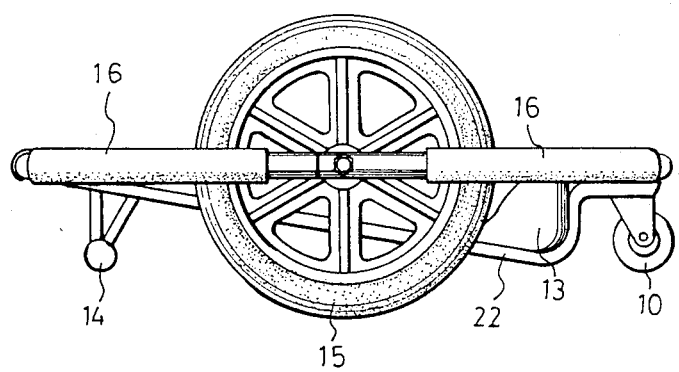
FIG. 3 is a side elevation view of the device.

Referring now to FIGS. 1 and 2, an exemplary preferred embodiment of a hand-propelled wheeled device of the present invention is illustrated in which a frame 11 consists of two U-shaped tubular pipes assembled together by inserting the two ends of one pipe into those of the other, thereby forming a substantially circular structure having two parallel sides. Two side wheels 15, each having a hand grip 7 attached thereto, are rotatably mounted on frame 11 oppositely to each other along, and inwardly of, the parallel sides thereof by fastening means which simultaneously secure the two U-shaped tubular pipes together. A seat supporting member 22 is mounted by fasteners to frame 11 at a position evenly spaced between side wheels 15 and parallel thereto. A footrest 14 formed of tubular pipe is attached to the underside of one end of supporting member 22. A seat 13 is slidably mounted on supporting member 22 toward the end opposite footrest 14 to provide sitting support for the user of the device. Preferably, seat 13 can be modified to include a backrest. Directly behind seat 13 and under seat supporting member 22, an auxiliary wheel 10 (see FIG. 3) is provided for support purposes.

A child who wishes to ride a device in accordance with this invention sits on seat 13 with his feet resting on footrest 14 and with his hands grasping hand grips 7. By manually rotating side wheels 15 in the same direction simultaneously, the device is caused to be selectively driven in the desired direction, while turning is accomplished by either counter-rotation of side wheels 15 simultaneously or by rotating only one of side wheels 15 while holding the other stationary.

In the exemplary preferred embodiment illustrated in the Figures, frame 11 is substantially covered with a soft sponge material 16, the purpose of which is to act as a shock absorber in the event of a collision of the device with others. Frame 11 may be easily dismantled at the position where side wheels 15 are mounted by the removal of the fastening means which simultaneously mount the wheels and secure the pipes together, thus permitting the entire assembly to be easily broken down for storage or transporting.

Those skilled in the art will readily recognize that various and sundry modifications of the hand-propelled wheeled device of the present invention may be made, depending upon the application at hand. Accordingly, the embodiment illustrated and discussed hereinabove should be understood to be exemplary only in nature, and the scope of the instant invention should be limited only by that of the following claims.

I claim:

1. A hand-propelled wheeled device comprising:
    a substantially circular frame having 2 parallel sides and assembled from a pair of U-shaped tubular pipes, one of said pipes having ends adapted for insertion into ends of said other pipe to form said frame;
    a pair of side wheels, each said side wheel being rotatably mounted to said frame inwardly along one of said parallel sides and opposite to the other, each said wheel having a handle mounted thereon for manually rotating said wheel;
    fastener means for simultaneously fastening said ends of said U-shaped pipes together and for rotatably mounting said side wheels thereto;
    a seat support member having an upper surface, a lower surface, a front end and a back end, said member being mounted to said frame at said front end and said back end and at a position evenly spaced between said two side wheels and parallel thereto;
    a footrest secured to said lower surface of said support member at said front end thereof;
    a seat disposed on said upper surface of said support member at a position toward said rear end thereof; and
    an auxiliary wheel mounted to said lower surface of said support member at said rear end thereof and directly behind said seat.

2. The device of claim 1, wherein said frame is substantially covered with a soft sponge material.

* * * * *